(12) United States Patent
Jung et al.

(10) Patent No.: US 12,021,923 B2
(45) Date of Patent: Jun. 25, 2024

(54) CONTENT PROVISION METHOD AND APPARATUS USING CONVERGENCE NETWORK

(71) Applicant: ELECTRONICS AND TELECOMMUNICATIONS RESEARCH INSTITUTE, Daejeon (KR)

(72) Inventors: Hoi-Yoon Jung, Sejong-si (KR); Sung-Ik Park, Daejeon (KR); Nam-Ho Hur, Sejong-si (KR); David Gomez-Barquero, Cartagena (ES); Carlos Barjau Estevan, Valencia (ES)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 18/188,229

(22) Filed: Mar. 22, 2023

(65) Prior Publication Data
US 2024/0015208 A1    Jan. 11, 2024

(30) Foreign Application Priority Data
Jul. 7, 2022    (KR) .......................... 10-2022-0083652

(51) Int. Cl.
*H04L 67/1021* (2022.01)
*H04L 69/08* (2022.01)
*H04L 69/164* (2022.01)

(52) U.S. Cl.
CPC .......... *H04L 67/1021* (2013.01); *H04L 69/08* (2013.01); *H04L 69/164* (2013.01)

(58) Field of Classification Search
CPC .... H04L 67/1021; H04L 69/08; H04L 69/164
See application file for complete search history.

(56) References Cited

U.S. PATENT DOCUMENTS

| 11,071,015 | B2 | 7/2021 | Jun et al. |
| 11,388,629 | B2* | 7/2022 | Simon ..................... H04L 7/027 |

(Continued)

FOREIGN PATENT DOCUMENTS

| KR | 10-2019-0136948 A | 12/2019 |
| KR | 10-2021-0149287 A | 12/2021 |

OTHER PUBLICATIONS

Saleh Alawaji. "IETF QUIC v1 Design", Dec. 2021, 13 pages. (Year: 2021).*

(Continued)

*Primary Examiner* — George C Neurauter, Jr.
(74) *Attorney, Agent, or Firm* — Rabin & Berdo, P.C.

(57) ABSTRACT

Disclosed herein are a content provision method and apparatus using a convergence network. The content provision method may include creating a Quick UDP Internet Connections V1 (QUICV1) path with User Equipment (UE) through a Fifth-Generation (5G) core, when content satisfies a preset condition while the content is being provided to the UE through the QUICV1 path, determining to offload the content through the 5G core, creating an Internet Protocol Security (IPSEC) tunnel with an Advanced Television Systems Committee (ATSC) gateway (GW) through the 5G core, generating a QUIC multicast stream, providing QUIC multicast session information to multiple UE devices, and providing the content to multiple UE devices, for which a mode switches from a QUICV1 mode to a QUIC multicast mode, through the ATSC GW.

20 Claims, 7 Drawing Sheets

(56) References Cited

U.S. PATENT DOCUMENTS

| | | |
|---|---|---|
| 2019/0199835 A1* | 6/2019 | Deval .................. H04L 69/162 |
| 2020/0305031 A1 | 9/2020 | Lee et al. |
| 2020/0344587 A1 | 10/2020 | Cho et al. |
| 2021/0377318 A1 | 12/2021 | Jung et al. |

OTHER PUBLICATIONS

J. Iyengar and M. Thomson. "Request for Comments (RFC) 9000: QUIC: A UDP-Based Multiplexed and Secure Transport", May 2021, 151 pages. (Year: 2021).*

Saleh Alawaji et al. "ATSC 3.0 for Future Broadcasting: Features and Extensibility", SET International Jornal of Broadcast Engineering, 2020, 16 pages. (Year: 2020).*

M. Bishop. "Request for Comments (RFC) 9114: HTTP/3", Jun. 2022, 57 pages. (Year: 2022).*

Sungjun Ahn et al. "Large-Scale Network Analysis on NOMA-Aided Broadcast/Unicast Joint Transmission Scenarios Considering Content Popularity", date of publication Jan. 27, 2020, 16 pages. (Year: 2020).*

Carlos Barjau Estevan. "Point-to_multipoint services on Fifth-Generation Mobile Networks", Departamento de Comunicaciones—Universitat Politecnica de Valencia, Nov. 2022, 144 pages. (Year: 2022).*

Carlos Barjau et al., "Limitations of ATSSS technology in ATSC 3.0—5G convergent systems", IEEE International Symposium on Broadband Multimedia Systems and Broadcasting (BMSB), Jun. 2021.

* cited by examiner

CONTENT PROVISION METHOD AND APPARATUS USING CONVERGENCE NETWORK

CROSS REFERENCE TO RELATED APPLICATION

This application claims the benefit of Korean Patent Application No. 10-2022-0083652, filed Jul. 7, 2022, which is hereby incorporated by reference in its entirety into this application.

BACKGROUND OF THE INVENTION

1. Technical Field

The present disclosure relates to a method and an apparatus for providing content using a convergence network.

2. Description of the Related Art

Recently, Internet traffic using a cellar network has rapidly increased, and most Internet traffic is estimated to be used for video transmission. Mobile Network Operators (MNO) cannot simultaneously broadcast the same multimedia content to multiple users because infrastructure has been designed through point-to-point (P2P) data transmission. Therefore, in order for mobile broadband networks to meet mass media requirements, collaboration between heterogeneous access networks is required.

Advanced Television Systems Committee (ATSC) 3.0 enables broadcast downlink access to be complementarily proposed, and has a function of allowing content to be delivered to multiple users through a single transmission. Further, since ATSC 3.0 has many similarities to those of Fifth-Generation (5G) technology, it is easy to configure a convergence network in which the two networks corresponding to ATSC 3.0 and 5G technologies are available.

A conventional convergence network has a difficulty in providing a convergent service due to an encryption problem to be essentially solved between two networks.

SUMMARY OF THE INVENTION

Accordingly, the present disclosure has been made keeping in mind the above problems occurring in the prior art, and an object of the present disclosure is to provide a convergence network architecture in which a 5G network and an ATSC 3.0 network are mutually connected to each other.

Another object of the present disclosure is to provide a method and apparatus for providing a convergent service using a convergence network.

A further object of the present disclosure is to provide a method and apparatus for providing multimedia content, which can provide multimedia content to multiple users.

In accordance with an aspect of the present disclosure to accomplish the above objects, there is provided a content provision method using a convergence network, including creating a Quick UDP Internet Connections V1 (QUICV1) path with User Equipment (UE) through a Fifth-Generation (5G) core, when content satisfies a preset condition while the content is being provided to the UE through the QUICV1 path, determining to offload the content through the 5G core, creating an Internet Protocol Security (IPSEC) tunnel with an Advanced Television Systems Committee (ATSC) gateway (GW) through the 5G core, generating a QUIC multicast stream, providing QUIC multicast session information to multiple UE devices, and providing the content to multiple UE devices, for which a mode switches from a QUICV1 mode to a QUIC multicast mode, through the ATSC GW.

The preset condition may be established based on popularity of the content.

The preset condition may be established based on a condition, in which the popularity of the content is equal to or greater than a reference value, and a geographic closeness condition.

The IPSEC tunnel with the ATSC GW may be created through an N3 Interworking Function (N3IWF) of the 5G core.

The content provision method may further include, when the preset condition is not satisfied, reactivating the QUICV1 mode and deactivating the QUIC multicast mode.

The content provision method may further include, when a response to failure in delivery of the content to the UE is received, requesting a QUIC packet range from the 5G core, and receiving the QUIC packet range from the 5G core.

The content provision method may further include, when the QUIC packet range is received from the 5G core, activating the QUICV1 mode, and providing the content to the UE through the QUICV1 path.

The convergence network may be configured using the 5G core and the ATSC GW.

The ATSC GW may include a 5G Application Function (AF) and an IPSEC client, and the 5G AF may perform a request to create, modify or discard a convergent service by attaching to the 5G core using a standardized 5G Application Programming Interface (API).

The IPSEC client may be used to attach the ATSC GW to the 5G core.

In accordance with another aspect of the present disclosure to accomplish the above objects, there is provided a content provision apparatus using a convergence network, including memory configured to store a control program for content provision, and a processor configured to execute the control program stored in the memory, wherein the processor is configured to create a Quick UDP Internet Connections V1 (QUICV1) path with User Equipment (UE) through a Fifth-Generation (5G) core, when content satisfies a preset condition while the content is being provided to the UE through the QUICV1 path, determine to offload the content through the 5G core, create an Internet Protocol Security (IPSEC) tunnel with an Advanced Television Systems Committee (ATSC) gateway (GW) through the 5G core, generate a QUIC multicast stream, provide QUIC multicast session information to multiple UE devices, and provide the content to multiple UE devices, for which a mode switches from a QUICV1 mode to a QUIC multicast mode, through the ATSC GW.

The preset condition may be established based on popularity of the content.

The preset condition may be established based on a condition, in which the popularity of the content is equal to or greater than a reference value, and a geographic closeness condition.

The processor may be configured to create the IPSEC tunnel with the ATSC GW through an N3 Interworking Function (N3IWF) of the 5G core.

The processor may be configured to, when the preset condition is not satisfied, reactivate the QUICV1 mode and deactivate the QUIC multicast mode.

The processor may be configured to, when a response to failure in delivery of the content to the UE is received, request a QUIC packet range from the 5G core, and receive the QUIC packet range from the 5G core.

The processor may be configured to, when the QUIC packet range is received from the 5G core, activate the QUICV1 mode, and provide the content to the UE through the QUICV1 path.

The convergence network may be configured using the 5G core and the ATSC GW.

The ATSC GW may include a 5G Application Function (AF) and an IPSEC client, and the 5G AF may perform a request to create, modify or discard a convergent service by attaching to the 5G core using a standardized 5G Application Programming Interface (API).

The IPSEC client may be used to attach the ATSC GW to the 5G core.

BRIEF DESCRIPTION OF THE DRAWINGS

The above and other objects, features and advantages of the present disclosure will be more clearly understood from the following detailed description taken in conjunction with the accompanying drawings, in which.

DESCRIPTION OF THE PREFERRED EMBODIMENTS

Figure 1:
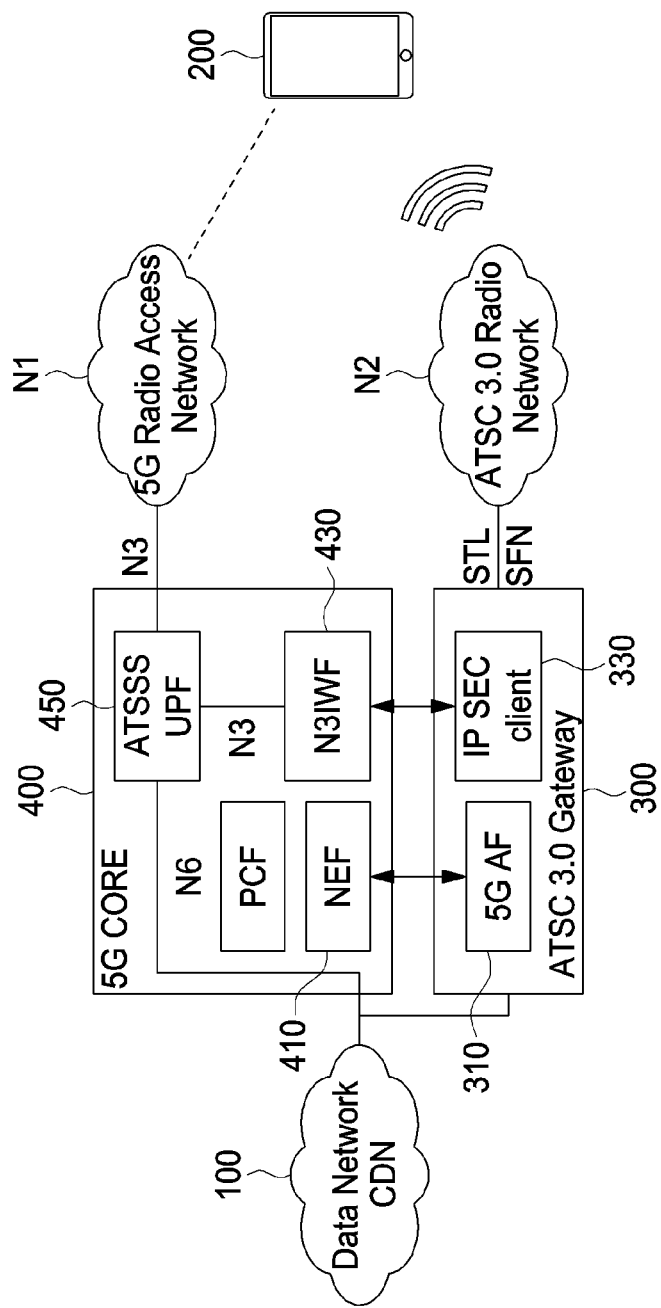
FIG. 1 is a conceptual diagram for explaining a mutual connection between 5G and ATSC 3.0 networks according to an embodiment.

Advantages and features of the present disclosure and methods for achieving the same will be clarified with reference to embodiments described later in detail together with the accompanying drawings. However, the present disclosure is capable of being implemented in various forms, and is not limited to the embodiments described later, and these embodiments are provided so that this disclosure will be thorough and complete and will fully convey the scope of the present disclosure to those skilled in the art. The present disclosure should be defined by the scope of the accompanying claims. The same reference numerals are used to designate the same components throughout the specification.

It will be understood that, although the terms "first" and "second" may be used herein to describe various components, these components are not limited by these terms. These terms are only used to distinguish one component from another component. Therefore, it will be apparent that a first component, which will be described below, may alternatively be a second component without departing from the technical spirit of the present disclosure.

The terms used in the present specification are merely used to describe embodiments, and are not intended to limit the present disclosure. In the present specification, a singular expression includes the plural sense unless a description to the contrary is specifically made in context. It should be understood that the term "comprises" or "comprising" used in the specification implies that a described component or step is not intended to exclude the possibility that one or more other components or steps will be present or added.

Unless differently defined, all terms used in the present specification can be construed as having the same meanings as terms generally understood by those skilled in the art to which the present disclosure pertains. Further, terms defined in generally used dictionaries are not to be interpreted as having ideal or excessively formal meanings unless they are definitely defined in the present specification.

In the present specification, each of phrases such as "A or B", "at least one of A and B", "at least one of A or B", "A, B, or C", "at least one of A, B, and C", and "at least one of A, B, or C" may include any one of the items enumerated together in the corresponding phrase, among the phrases, or all possible combinations thereof.

Embodiments of the present disclosure will now be described in detail with reference to the accompanying drawings. Like numerals refer to like elements throughout, and overlapping descriptions will be omitted.

FIG. 1 is a conceptual diagram for explaining a mutual connection between 5G and ATSC 3.0 networks according to an embodiment.

Referring to FIG. 1, a convergence network according to an embodiment may include an ATSC 3.0 gateway (GW) 300, a 5G core 400, a 5G access network (5G radio access network) N1, and an ATSC 3.0 broadcast network (ATSC 3.0 radio network) N2.

The functions of the ATSC 3.0 GW 300 may reside in the 5G core 400. The ATSC 3.0 GW 300 may be configured such that two functional blocks, that is, a 5G Application Function (AF) 310 and an Internet Protocol Security (IPSEC) client 330 are integrated with each other on a baseline.

The 5G AF 310 may be connected to the Network Exposure Function (NEF) 410 of the 5G core 400 using a standardized 5G Application Programming Interface (API), and may then create, modify or discard a convergent service. The 5G AF 310 may convert requirements into ATSC 3.0 radio parameters that are capable of meeting coverage, reliability, and bandwidth requirements.

The IPSEC client 330 may be used to attach the ATSC 3.0 GW 300 to the 5G core 400 through a N3 Interworking Function (N3IWF) 430. The ATSC 3.0 GW 300 may be a device connected to the end of the 5G core 400.

The ATSC 3.0 GW 300 may define a service quality between the 5G core 400 and a broadcast network using a predefined 5G Quality Indicator (5QI).

Multimedia content transferred from a data network (or a Content Delivery Network, hereinafter referred to as a 'CDN') 100 may be delivered to the 5G core 400, and the N3IWF 430 of the 5G core 400 may deliver the multimedia content to the IPSEC client 330 of the ATSC 3.0 GW 300. Due to this process, the ATSC 3.0 GW 300 may attach to the 5G access network N1.

By means of this connection (or attachment), encryption essential for the ATSC 3.0 GW 300 may be terminated earlier, and the multimedia content may be delivered to the ATSC 3.0 broadcast network N2.

A user terminal (User Equipment: UE) 200 may receive multimedia content requested to be transmitted over the 5G access network N1 or the ATSC 3.0 broadcast network N2. In the UE 200, a chipset capable of supporting both 5G transmission and ATSC 3.0 transmission may be embedded.

Figure 2:
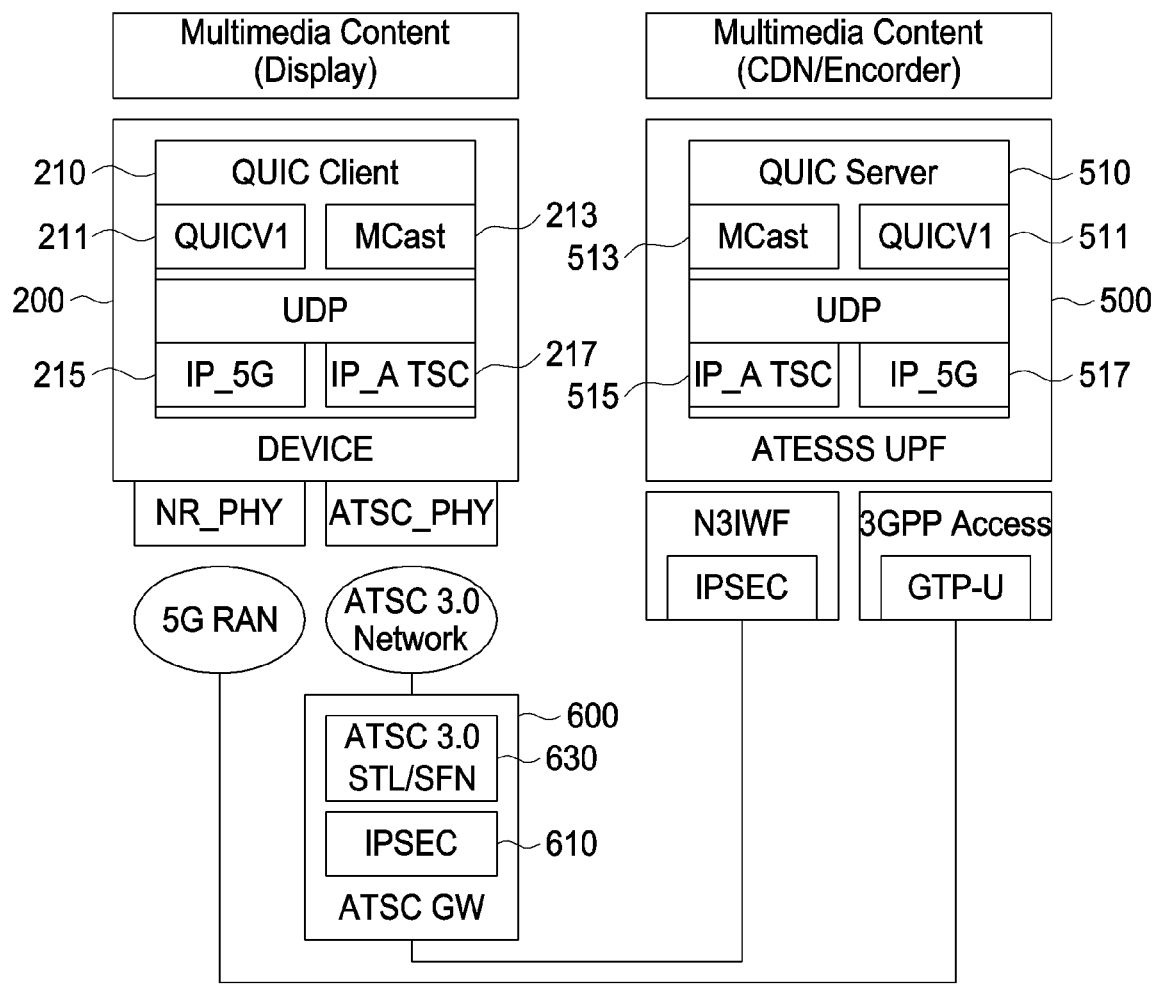
FIG. 2 is a block diagram illustrating the architecture of a convergence network according to an embodiment.

FIG. 2 is a block diagram illustrating the architecture of a convergence network according to an embodiment.

Referring to FIG. 2, the convergence network according to the embodiment may be the component of a 5G standard network core in which 5G and ATSC 3.0 networks are converged with each other.

The UE (device) 200 may be equipped with a Quick UDP Internet Connection (QUIC) client including a QUICV1 211 and a MCast 213, and may integrate User Datagram Protocols (UDP) with each other. The UDP may include an IP_5G 215 and an IP_ATSC 217. A User Plane Function (UPF) 500 may be equipped with a QUIC server 510 including QUICV1 and MCast, and may integrate UDPs with each other.

The QUIC protocols of the UE 200 and the UPF 500 may be used, and QUIC protocols may be used for a multimedia convergent service. Each multimedia convergent service for QUIC connections has a unique connection ID (CxID), but has different streams and IP pairing types (e.g., pairing for ATSC connection and pairing for 5G connection) with respect to respective access networks in which the corresponding service is used. By means of this, the QUIC client 210 of the UE 200 may easily switch or adjust the flow of multimedia content between access networks by notifying the UE 200 to switch to another stream and deliver data to the corresponding access network. A determination for such a content flow may be performed depending on the type of convergent service and the transmission status of networks, which are provided based on messages sent from a 5G core network or the 5G AF 630 of an ATSC 3.0 GW 600.

Figure 3:
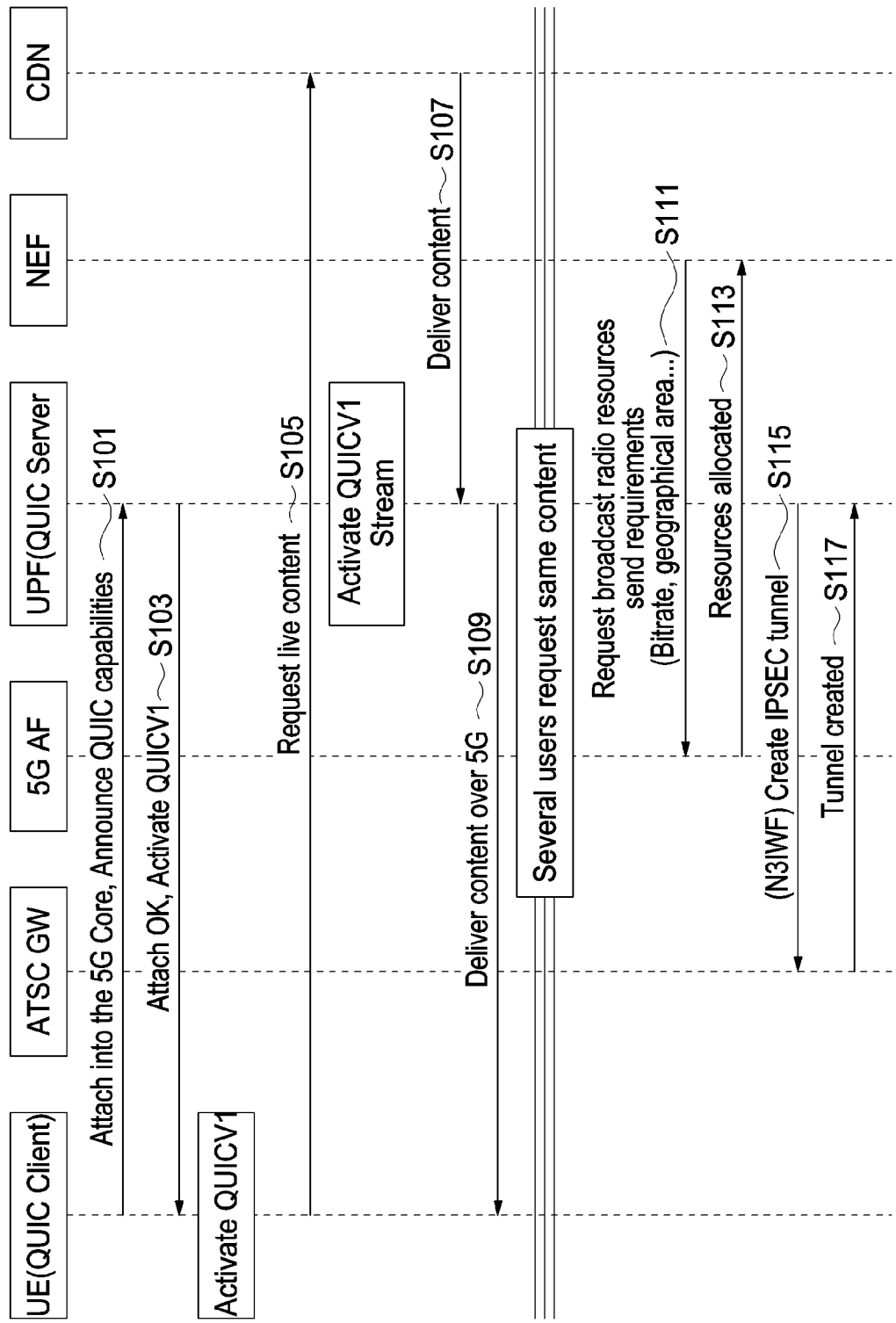
FIGS. 3 and 4 are signal flowcharts for explaining a video offload mode using a convergence network according to an embodiment.
Figure 4:
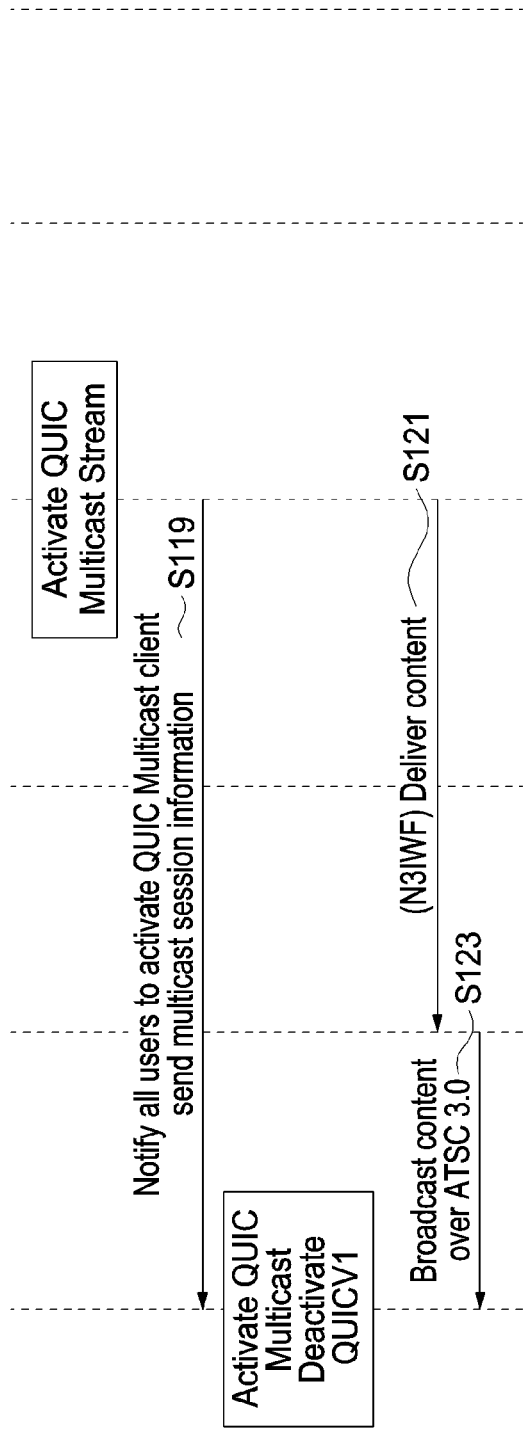

FIGS. 3 and 4 are signal flowcharts for explaining a video offload mode using a convergence network according to the present disclosure.

Video offloading may refer to a service for moving a user who consumes content from a 5G network to an ATSC 3.0 network in order to easily utilize content and exploit a point-to-multipoint (P2M) function.

As illustrated in FIG. 3, User Equipment (UE) may request multimedia content from a data network (Content Delivery Network: CDN) over the 5G network, and may attach to a 5G core to notify a User Plane Function (UPF) of Advanced Traffic Steering, Switching and Splitting (ATSSS) and QUIC functions thereof at step S101. The UPF may accept attachment and transfer a QUICV1 activation command at step S103. The UE may activate a QUICV1 mode. The 5G core may create a QUICV1 path between the UE and the UPF.

The UE may request content from the CDN at step S105. The UPF may activate a QUICV1 stream, and the CDN may deliver the content to the UPF at step S107. The UPF may deliver the content to the UE over the 5G network at step S109.

When the UE supports ATSC 3.0 connection, a stream for a QUIC multicast route, together with a configuration for setting up the connection from the 5G core, may be created.

When a preset condition, for example, a condition in which content has popularity (e.g., a live sports event or viral content) and UE for providing one ATSC 3.0 GW is present at a geographically closer location, is satisfied, the 5G core may determine to offload the content and deliver the content over the ATSC network. Here, the content popularity condition may denote a value when the number of selections of the corresponding content is equal to or greater than a reference value, and the geographic closeness condition may denote the case where the UE is geographically located at a distance shorter than or equal to a reference value.

The NEF of the 5G core may request resource transmission requirements (e.g., bit rate, a geographical area, etc.) from the 5G AF of the ATSC 3.0 GW at step S111. The 5G AF may allocate resources to the NEF at step S113.

The UPF may create an IPSEC tunnel with the ATSC 3.0 GW through the N3IWF at step S115. The ATSC 3.0 GW may also create a tunnel with the UPF at step S117.

As illustrated in FIG. 4, the UPF may generate a QUIC multicast stream. The UPF may send multicast session information to all users for whom QUIC multicast streams are generated at step S119. The UE may deactivate the QUICV1 mode and activate a QUIC multicast mode.

The UPF may deliver the content to the ATSC 3.0 GW through the N3IWF at step S121. The ATSC 3.0 GW may broadcast the content (broadcast content) over the ATSC 3.0 network at step S123.

Finally, when the preset condition is not satisfied, that is, when the popularity of the corresponding content is lost, the QUICV1 mode may be activated again and the QUIC multicast mode may be deactivated through a standard paging process.

Figure 5:
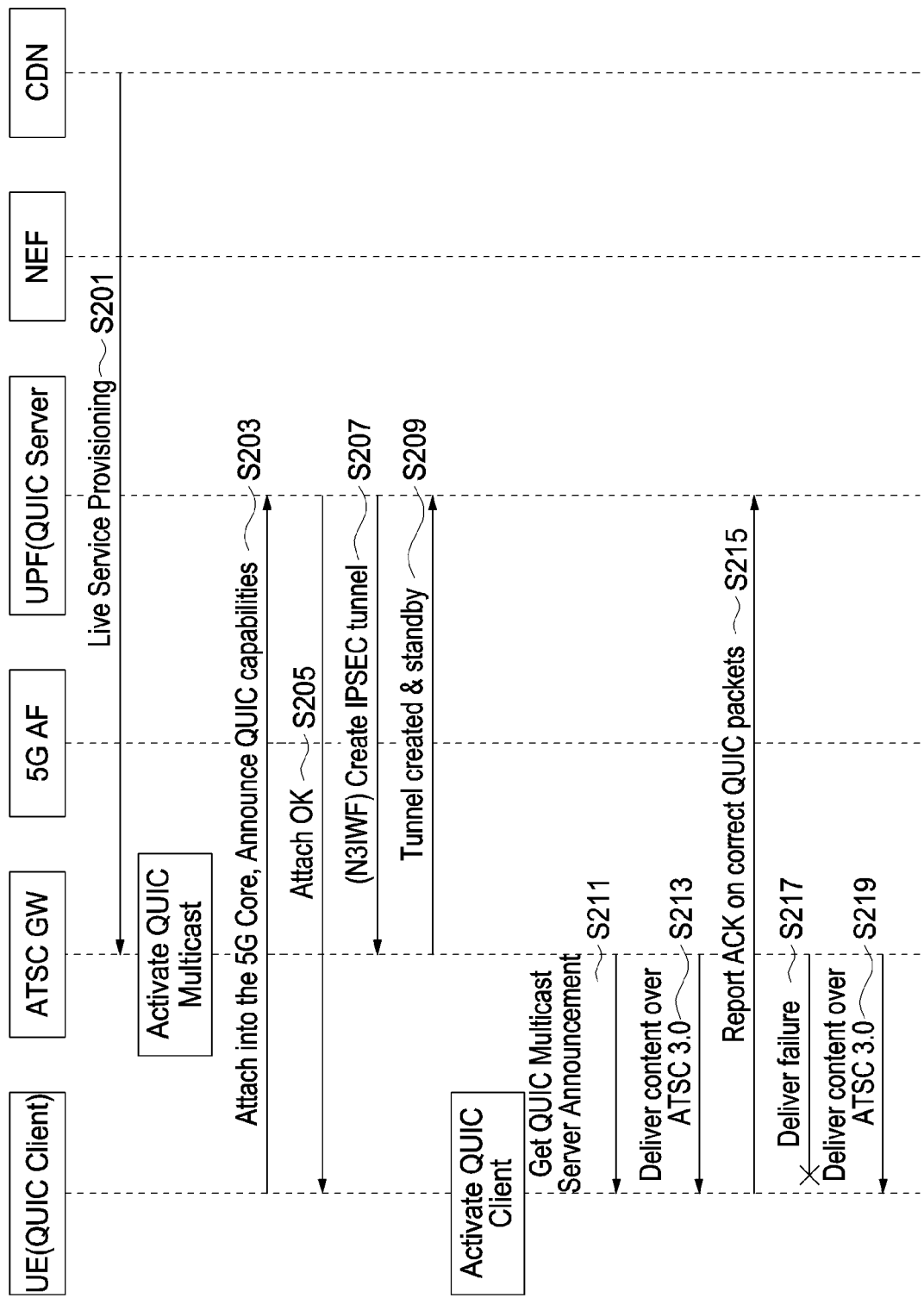
FIGS. 5 and 6 are signal flowcharts for explaining a file recovery mode using a convergence network according to an embodiment.
Figure 6:
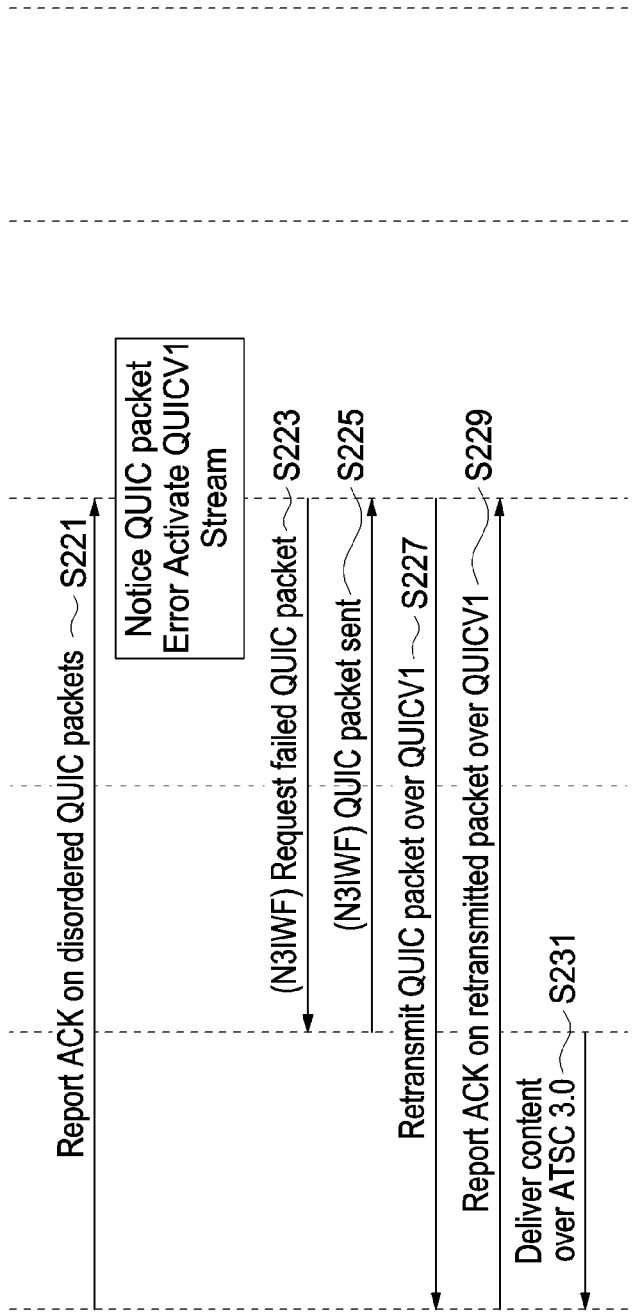

FIGS. 5 and 6 are signal flowcharts for explaining a file recovery mode using a convergence network according to the present disclosure.

File recovery may refer to a service for retransmitting and recovering falsely decoded multimedia content. Before transmission of multimedia content starts, it may be assumed that an ATSC 3.0 network and a 5G core network are mutually connected to each other by exchanging all associated messages with each other.

As illustrated in FIG. 5, when a mutual connection is completed, an ATSC 3.0 GW may provision live multimedia data to be broadcasted from a CDN at step S201. The ATSC 3.0 GW may activate a QUIC multicast mode.

At a time point in the future, the UE may attach to the 5G core and announce the QUIC function (QUIC capabilities) thereof to a UPF at step S203. The UPF may accept attachment at step S205, and may create an IPSEC tunnel with the ATSC 3.0 GW at step S207. The ATSC 3.0 GW may create a tunnel with the UPF to stand by at step S209.

The UE may activate a QUIC client. The UE may receive a QUIC multicast service announcement from the ATSC 3.0 GW at step S211. The UE may be provided with content from the ATSC 3.0 GW over an ATSC 3.0 network at step S213. The UE may provide a response to a correct QUIC packet (i.e., report Acknowledgement: ACK) on the correct QUIC packet) to the UPF at step S215.

When delivery of content from the ATSC 3.0 GW fails at step S217, the ATSC 3.0 GW may deliver again the content over the ATSC 3.0 network at step S219.

As illustrated in FIG. 6, the UE may report a response (Acknowledgement: ACK) to disordered QUIC packets to the UPF at step S221. The UPF may notice that delivery of the content has failed, and may activate a QUICV1 mode.

The UPF may request an accurate QUIC packet range from the ATSC 3.0 GW using N3IWF at step S223. The ATSC 3.0 GW may send information about QUIC packets to the UPF at step S225.

The UPF may retransmit QUIC packets to the UE through QUICV1 at step S227. The UE may transmit a response (ACK) to the retransmitted QUIC packets to the UPF at step S229.

The ATSC 3.0 GW may broadcast the content to multiple UE devices over the ATSC 3.0 network at step S231.

The content provision apparatus according to an embodiment may be implemented in a computer system such as a computer-readable storage medium.

Figure 7:
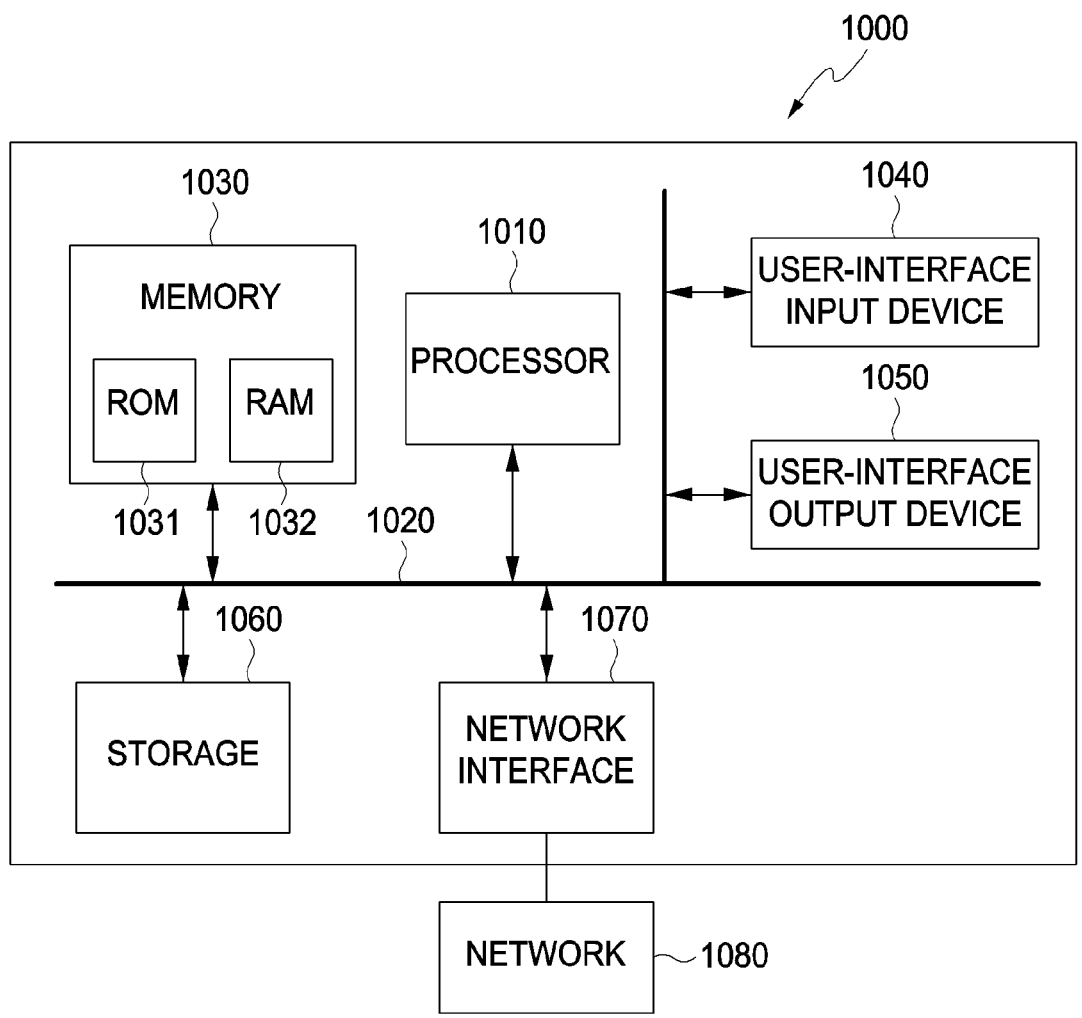
FIG. 7 is a block diagram illustrating the configuration of a computer system according to an embodiment.

FIG. 7 is a block diagram illustrating the configuration of a computer system according to an embodiment.

Referring to FIG. 7, a computer system 1000 according to an embodiment may include one or more processors 1010, memory 1030, a user interface input device 1040, a user interface output device 1050, and storage 1060, which communicate with each other through a bus 1020. The computer system 1000 may further include a network interface 1070 connected to a network 1080.

Each processor 1010 may be a Central Processing Unit (CPU) or a semiconductor device for executing programs or processing instructions stored in the memory 1030 or the storage 1060. The processor 1010 may be a kind of CPU, and may control the overall operation of the content provision apparatus.

The processor 1010 may include all types of devices capable of processing data. The term processor as herein used may refer to a data-processing device embedded in hardware having circuits physically constructed to perform a function represented in, for example, code or instructions included in the program. The data-processing device embedded in hardware may include, for example, a microprocessor, a CPU, a processor core, a multiprocessor, an application-specific integrated circuit (ASIC), a field-programmable gate array (FPGA), etc., without being limited thereto.

The memory 1030 may store various types of data for the overall operation such as a control program for performing a content provision method according to an embodiment. In detail, the memory 1030 may store multiple applications executed by the content provision apparatus, and data and instructions for the operation of the content provision apparatus.

Each of the memory 1030 and the storage 1060 may be a storage medium including at least one of a volatile medium, a nonvolatile medium, a removable medium, a non-removable medium, a communication medium, an information delivery medium or a combination thereof. For example, the memory 1030 may include Read-Only Memory (ROM) 1031 or Random Access Memory (RAM) 1032.

In accordance with an embodiment, a computer-readable storage medium for storing a computer program may include instructions enabling the processor to perform a method including an operation of creating a Quick UDP Internet Connections V1 (QUICV1) path with User Equipment (UE) through a Fifth-Generation (5G) core, when content satisfies a preset condition while the content is being provided to the UE through the QUICV1 path, an operation of determining to offload the content through the 5G core, an operation of creating an Internet Protocol Security (IPSEC) tunnel with an Advanced Television Systems Committee (ATSC) gateway (GW) through the 5G core, an operation of generating a QUIC multicast stream, an operation of providing QUIC multicast session information to multiple UE devices, and an operation of providing the content to multiple UE devices, for which a mode switches from a QUICV1 mode to a QUIC multicast mode, through the ATSC GW.

In accordance with an embodiment, a computer program stored in a computer-readable storage medium may include instructions enabling the processor to perform a method including an operation of creating a QUICV1 path with UE through a 5G core, when content satisfies a preset condition while the content is being provided to the UE through the QUICV1 path, an operation of determining to offload the content through the 5G core, an operation of creating an IPSEC tunnel with an ATSC GW through the 5G core, an operation of generating a QUIC multicast stream, an operation of providing QUIC multicast session information to multiple UE devices, and an operation of providing the content to multiple UE devices, for which a mode switches from a QUICV1 mode to a QUIC multicast mode, through the ATSC GW.

The particular implementations shown and described herein are illustrative examples of the present disclosure and are not intended to limit the scope of the present disclosure in any way. For the sake of brevity, conventional electronics, control systems, software development, and other functional aspects of the systems may not be described in detail. Furthermore, the connecting lines or connectors shown in the various presented figures are intended to represent exemplary functional relationships and/or physical or logical couplings between the various elements. It should be noted that many alternative or additional functional relationships, physical connections, or logical connections may be present in an actual device. Moreover, no item or component may be essential to the practice of the present disclosure unless the element is specifically described as "essential" or "critical".

The present disclosure is advantageous in that content may be transparently broadcasted, and a service converged with terrestrial broadcasting may be provided.

Further, the present disclosure is advantageous in that efficient interaction between 5G and ATSC 3.0 networks may be implemented while standardized policies, service quality profiles, protocols, and processes are reused.

Furthermore, the present disclosure is advantageous in that adjustment and switching of traffic may be smoothly performed by utilizing QUIC.

Therefore, the spirit of the present disclosure should not be limitedly defined by the above-described embodiments, and it is appreciated that all ranges of the accompanying claims and equivalents thereof belong to the scope of the spirit of the present disclosure.

What is claimed is:

1. A content provision method using a convergence network, comprising:
    creating a Quick UDP Internet Connections V1 (QUICV1) path with User Equipment (UE) through a Fifth-Generation (5G) core;
    when content satisfies a preset condition while the content is being provided to the UE through the QUICV1 path, determining to offload the content through the 5G core;
    creating an Internet Protocol Security (IPSEC) tunnel with an Advanced Television Systems Committee (ATSC) gateway (GW) through the 5G core;
    generating a QUIC multicast stream;
    providing QUIC multicast session information to multiple UE devices; and
    providing the content to multiple UE devices, for which a mode switches from a QUICV1 mode to a QUIC multicast mode, through the ATSC GW.

2. The content provision method of claim 1, wherein the preset condition is established based on popularity of the content.

3. The content provision method of claim 2, wherein the preset condition is established based on a condition, in which the popularity of the content is equal to or greater than a reference value, and a geographic closeness condition.

4. The content provision method of claim 1, wherein the IPSEC tunnel with the ATSC GW is created through an N3 Interworking Function (N3IWF) of the 5G core.

5. The content provision method of claim 1, further comprising:
    when the preset condition is not satisfied, reactivating the QUICV1 mode and deactivating the QUIC multicast mode.

6. The content provision method of claim 1, further comprising:
when a response to failure in delivery of the content to the UE is received, requesting a QUIC packet range from the 5G core, and receiving the QUIC packet range from the 5G core.

7. The content provision method of claim 6, further comprising:
when the QUIC packet range is received from the 5G core, activating the QUICV1 mode, and
providing the content to the UE through the QUICV1 path.

8. The content provision method of claim 1, wherein the convergence network is configured using the 5G core and the ATSC GW.

9. The content provision method of claim 1, wherein:
the ATSC GW comprises a 5G Application Function (AF) and an IPSEC client, and
the 5G AF performs a request to create, modify or discard a convergent service by attaching to the 5G core using a standardized 5G Application Programming Interface (API).

10. The content provision method of claim 9, wherein the IPSEC client is used to attach the ATSC GW to the 5G core.

11. A content provision apparatus using a convergence network, comprising:
a memory configured to store a control program for content provision; and
a processor configured to execute the control program stored in the memory,
wherein the processor is configured to create a Quick UDP Internet Connections V1 (QUICV1) path with User Equipment (UE) through a Fifth-Generation (5G) core, when content satisfies a preset condition while the content is being provided to the UE through the QUICV1 path, determine to offload the content through the 5G core, create an Internet Protocol Security (IPSEC) tunnel with an Advanced Television Systems Committee (ATSC) gateway (GW) through the 5G core, generate a QUIC multicast stream, provide QUIC multicast session information to multiple UE devices, and provide the content to multiple UE devices, for which a mode switches from a QUICV1 mode to a QUIC multicast mode, through the ATSC GW.

12. The content provision apparatus of claim 11, wherein the preset condition is established based on popularity of the content.

13. The content provision apparatus of claim 12, wherein the preset condition is established based on a condition, in which the popularity of the content is equal to or greater than a reference value, and a geographic closeness condition.

14. The content provision apparatus of claim 11, wherein the processor is configured to create the IPSEC tunnel with the ATSC GW through an N3 Interworking Function (N3IWF) of the 5G core.

15. The content provision apparatus of claim 11, wherein the processor is configured to, when the preset condition is not satisfied, reactivate the QUICV1 mode and deactivate the QUIC multicast mode.

16. The content provision apparatus of claim 11, wherein the processor is configured to, when a response to failure in delivery of the content to the UE is received, request a QUIC packet range from the 5G core, and receive the QUIC packet range from the 5G core.

17. The content provision apparatus of claim 16, wherein the processor is configured to:
when the QUIC packet range is received from the 5G core, activate the QUICV1 mode, and
provide the content to the UE through the QUICV1 path.

18. The content provision apparatus of claim 11, wherein the convergence network is configured using the 5G core and the ATSC GW.

19. The content provision apparatus of claim 11, wherein:
the ATSC GW comprises a 5G Application Function (AF) and an IPSEC client, and
the 5G AF performs a request to create, modify or discard a convergent service by attaching to the 5G core using a standardized 5G Application Programming Interface (API).

20. The content provision apparatus of claim 19, wherein the IPSEC client is used to attach the ATSC GW to the 5G core.

* * * * *